United States Patent [19]

Ledginham et al.

[11] Patent Number: 5,190,145
[45] Date of Patent: Mar. 2, 1993

[54] APPARATUS FOR SUPPORTING CONVEYOR BELTS

[75] Inventors: Stuart J. Ledginham, Coto de Caza; Dale I. Goldberg, Irvine, both of Calif.

[73] Assignee: Valu Engineering, Inc., Irvine, Calif.

[21] Appl. No.: 790,672

[22] Filed: Nov. 8, 1991

Related U.S. Application Data

[63] Continuation-in-part of Ser. No. 768,354, Sep. 30, 1991, abandoned, which is a continuation of Ser. No. 611,163, Nov. 9, 1990, abandoned.

[51] Int. Cl.$^5$ ............................................. B05G 15/60
[52] U.S. Cl. ...................................................... 198/841
[58] Field of Search ........................................ 198/841

[56] References Cited

U.S. PATENT DOCUMENTS 3,964,800  6/1976  Grimes et al. ............... 198/841 X
4,325,480  4/1982  Butt ................................... 198/841

OTHER PUBLICATIONS

Engineering Manual by Rexnord relating to table top chains. 1989 Catalog.
Marbett Catalog 10, dated Aug. '89, entitled "Conveyor Components", p. 25.

*Primary Examiner*—Robert P. Olszewski
*Assistant Examiner*—Cheryl L. Gastineau
*Attorney, Agent, or Firm*—Knobbe, Martens, Olson & Bear

[57] ABSTRACT

A multifunction return-way system for one or more chains in a conveyor system. U-shaped mounting clips, having U-shaped arm ends, are snapped onto cross members between frame portions of the conveyor system, and are shaped to have snapped therein wear strips that are oriented in serpentine manner as viewed from above. Portions of the wear strips are maintained spaced apart by spacers mounted onto the rods and by spacer pins that are provided on the mounting clips for association with each other or with side frames. The mounting clips are thus trapped in desired locations. Intermediate clips, or pinch clips, are provided to hold central regions of the wear strips close to each other, at regions where there are no cross members.

48 Claims, 5 Drawing Sheets

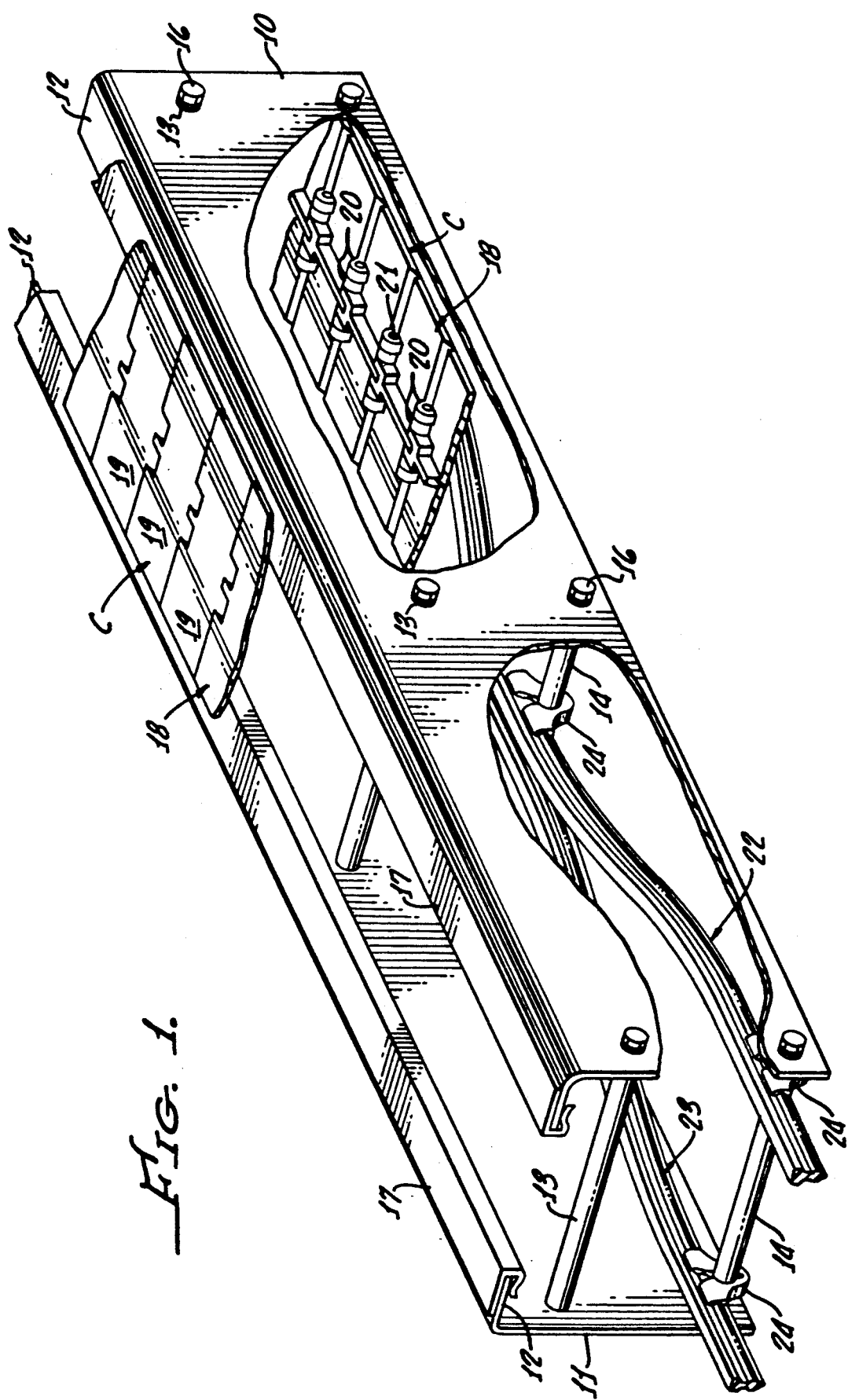

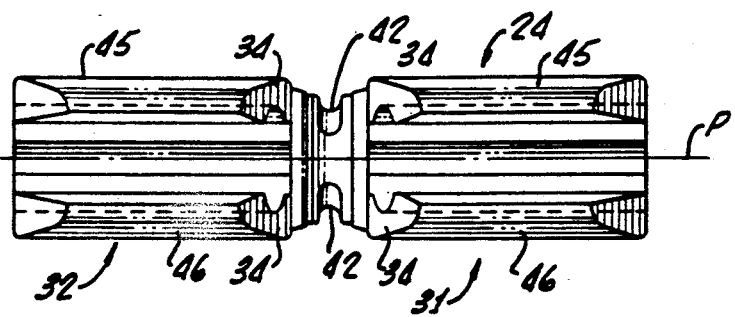
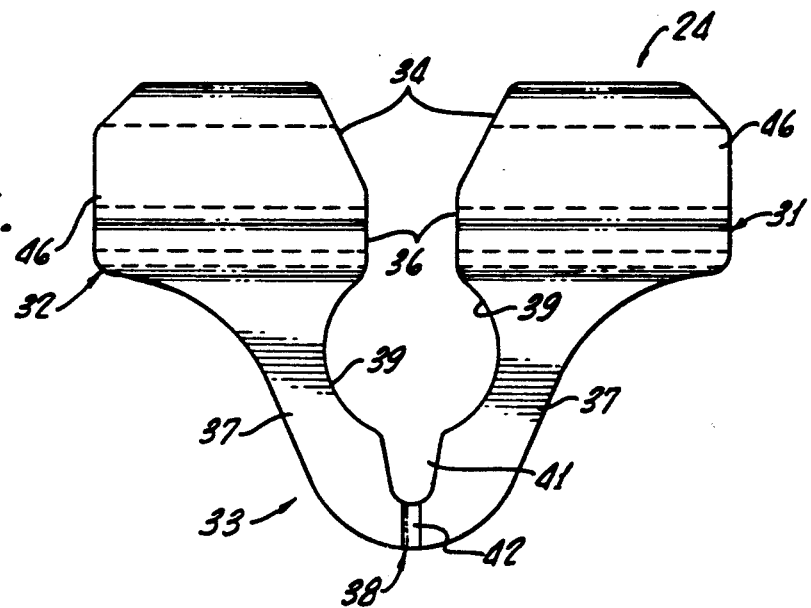
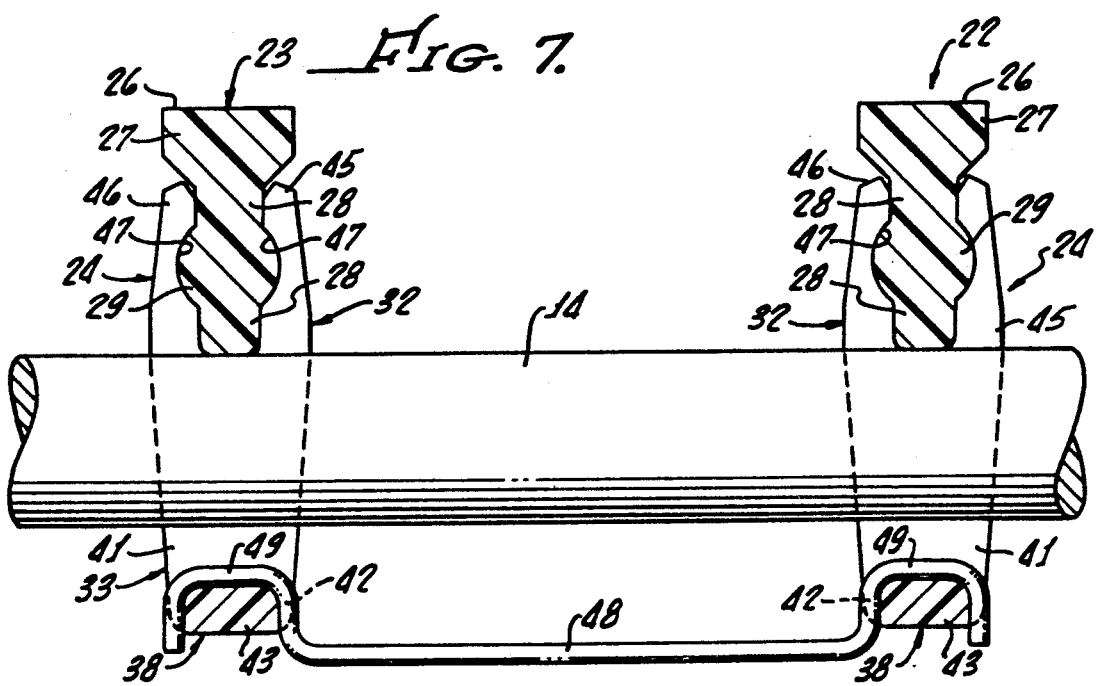

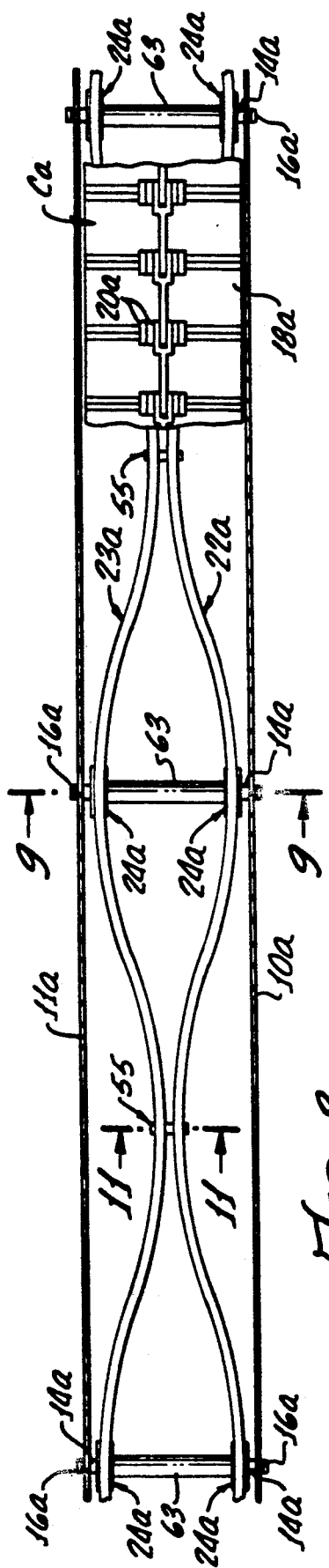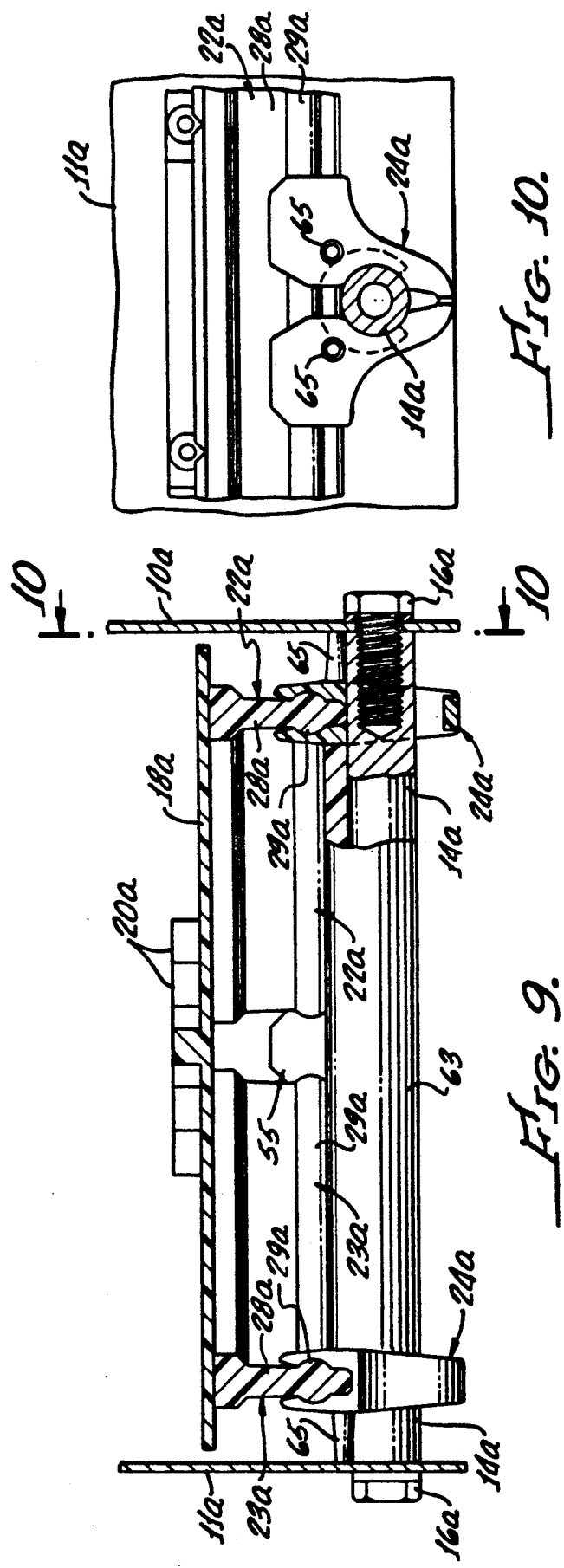

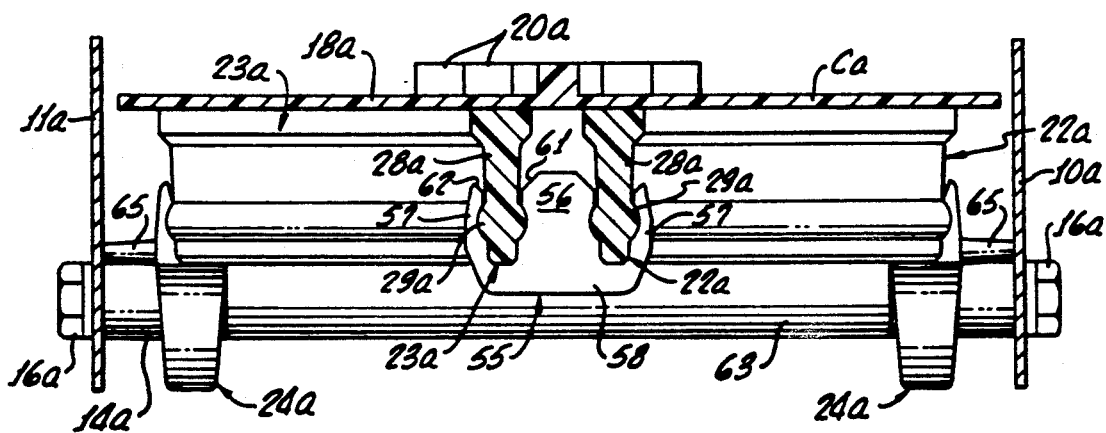
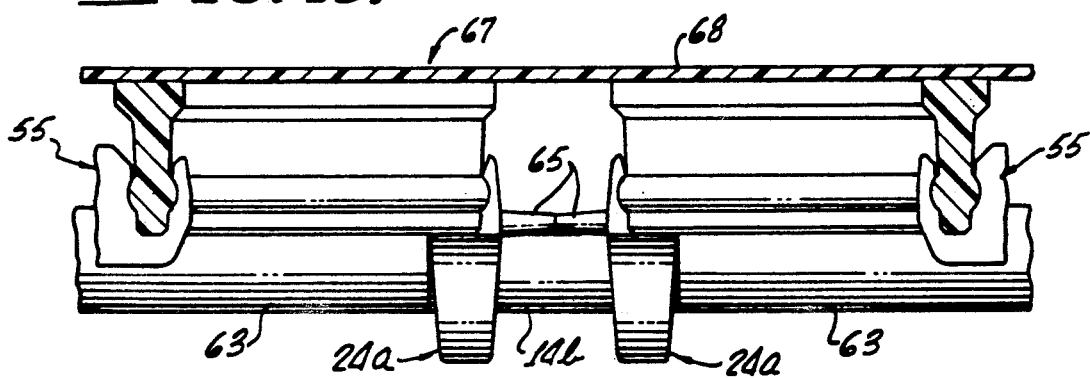
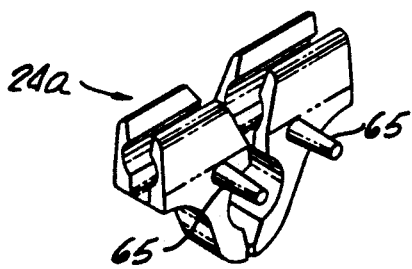
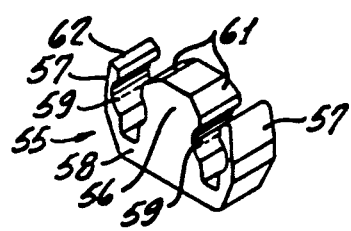
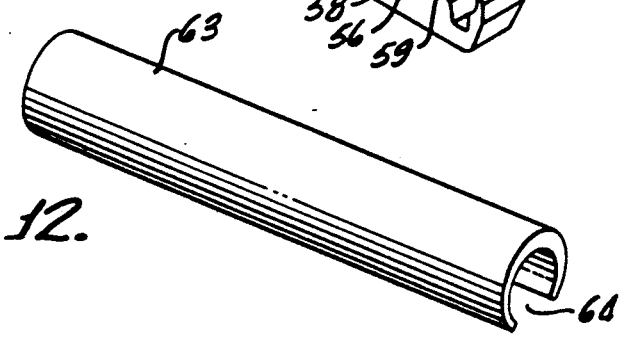

APPARATUS FOR SUPPORTING CONVEYOR BELTS

CROSS-REFERENCE TO PRIOR APPLICATIONS

This is a continuation-in-part of patent application Ser. No. 768,354, filed Sept. 30, 1991, now abandoned, which is a continuation of now-abandoned patent application Ser. No. 611,163, filed Nov. 9, 1990.

BACKGROUND OF THE INVENTION

It is very important and desirable in a return way system for conveyor chains that the return way elements (wear strips) be quickly and easily mountable in either new or old conveyor systems, preferably without need for tools. It is, additionally, important that a minimum number of return way components be employed; stated otherwise, that elements already present in the conveyor system be double used. Furthermore, the wear strips and associated parts must be adaptable for use on a wide variety of sizes and types of conveyors, and on various shapes of conveyors. Another highly important requirement is that the wear strips not tend to wear grooves in the upper surfaces of chains when the latter are in their inverted positions on the return run of a conveyor chain loop.

It is also very important that the return way be such that the conveyor chain will not tip or sag substantially at regions between supports, but for reasons of costs and simplicity it is greatly preferred that this be accomplished without changing structural elements already present in an existing conveyor system (such as, for example, cross members or connectors that extend between the side frames). An additional major consideration is that, even in conveyor systems where the conveyor chains are often slippery due to the presence of liquid spilled or splashed from containers being conveyed, the return way elements will remain in desired positions and will not creep or shift along wet cross members in response to vibratory or other forces.

SUMMARY OF THE INVENTION

The present apparatus is primarily a return way for conveyor chains (or belts). However, the apparatus may also be employed as a carrying way for conveyor chains. Some aspects of the apparatus may be employed as a guide rail system for conveyors. The present apparatus may be employed in either new or existing conveyor systems.

In accordance with one aspect of the present invention, there is provided the combination of a mounting clip with a conveyor system, one part of the mounting clip being adapted to mount onto elements already present in the conveyor system, another part of the mounting clip being adapted to receive elongate elements that cooperate with moving things already present in the system.

In accordance with another aspect of the invention, a U-shaped mounting clip is provided having one part that snaps onto a support element in a conveyor system, for mounting the mounting clip onto such support element, and having another part adapted to have snapped therein an elongate element that cooperates with moving things in the conveyor system. Such other part is also U-shaped and is at the end of at least one arm of the mounting clip.

In accordance with another aspect of the invention, resilient clip elements have first portions adapted to snap onto cross members extending between the side frames of a conveyor system, and also have second portions adapted to have elongate wear strips snapped therein, such second portions being generally at right angles to such first portions.

In accordance with another aspect of the invention, there is provided a clip adapted to receive two elongate wear strips, such wear strips being generally serpentine, such clip being where the wear strips are closest to each other, the clip and the wear strips being cooperatively adapted to hold the wear strips in proper positions even in the absence of an adjacent cross member between side frames of the conveyor system.

An additional aspect of the invention comprises the combination of a conveyor system having cross members between side frames, with a plurality of mounting clips and other clips that hold the wear strips in serpentine relationship, and so constructed and arranged as to prevent substantial movement of the wear strips.

A further aspect of the invention comprises wear strip-supporting mounting clips having spacer elements thereon, such spacer elements being adapted to abut either side frames or other mounting clips.

BRIEF DESCRIPTION OF THE DRAWINGS

FIG. 1 is an isometric view of a portion of a conveyor, including the present return way, portions of a side frame being broken away so as to show components of the return way system;

FIG. 5 is a top plan view of one of the mounting elements, namely mounting clips, for the return way elements (wear strips);

FIG. 6 is an elevational view showing either side of such mounting element or clip;

FIG. 7 is a partial assembly view showing two mounting clips mounted on a cross member or connector rod, and also showing two wear strips mounted in the clips and supported on such rod;

FIG. 8 is a horizontal sectional view showing a second embodiment of the invention, the view being taken at a point above the elements of the return way, and above the return run of the conveyor chain, and showing serpentine wear strips that are supported only at their regions relatively remote from each other, and not at their regions where they come into relative proximity with each other;

FIG. 9 is an enlarged vertical section view on line 9—9 of FIG. 8;

FIG. 10 is a fragmentary sectional view on line 10—10 of FIG. 9;

FIG. 11 is a vertical sectional view on line 11—11 of FIG. 8;

FIG. 12 is an isometric view of a spacer element for mounting on a connector that extends between side frames;

FIG. 13 is an isometric view of a mounting clip having a spacer element provided thereon;

FIG. 14 is an isometric view of an intermediate clip that associates with each other the regions of the wear strips that are relatively close to each other; and FIG. 15 is a view corresponding to FIG. 11 but showing portions of two return-way systems beneath the return run of a wide conveyor chain.

DETAILED DESCRIPTION OF THE FIRST EMBODIMENT (FIGS. 1-7)

Figure 4:
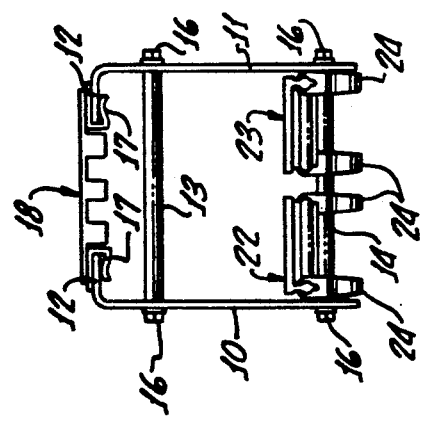
FIG. 4 is an end view of the present system, as viewed from the right in FIG. 3.

The present invention may be incorporated in conveyor systems having various types of chains, various widths of chains, single or stacked (multiple) chains, etc. What is illustrated in the drawings showing the first embodiment is an exemplary system having a single chain that is rather narrow.

It is to be understood that the present invention is typically incorporated in conveyor systems having the usual leg elements, side rails, drive sprocket elements, motors, transfer mechanisms, etc. For simplicity of description and illustration, only the portions of a conveyor system that are most closely associated with the present invention are shown in the drawings and described herein.

Referring to FIGS. 1-4, a typical section of the main body of a conveyor system is illustrated. There are two side frames 10,11 that are mirror images of each other, each side frame having an upper flange 12 that extends inwardly in a horizontal plane. The side frames may also have lower horizontal flanges but this is not necessary when the present invention is employed. No such lower flanges are present in the illustrated apparatus.

Side frames 10,11 are connected together by upper and lower rows of tubes or rods 13 and 14, respectively, that are sometimes called cross members or connectors, or supports. The cross members 14 in at least the lower row thereof lie in the same horizontal plane and are spaced substantial distances from each other as illustrated. It is to be understood that the cross members 13,14 may or may not be hollow, and that they may have any desired diameter—the diameters being larger when the distances between the side frames are greater. The tubes are preferably cylindrical in exterior configuration, but this is not necessarily the case relative to certain forms of the invention.

In the illustrated form, the cross members are secured in place by screws 16 that are threaded axially into opposite ends of the cross members, after being inserted through holes in the webs of the side frames. Suitable washers are provided.

Upper wear strips 17, formed of wear-resistant synthetic resin material, are mounted on flanges 12. The U-shaped cross sections of the upper wear strips 17 are such that the strips grip the flanges 12 frictionally and thus stay in position. The preferred wear-strip material is ultra high molecular weight polyethylene (hereinafter called UHMW).

A conveyor chain C is provided and goes around suitable sprockets (not shown) some of which are driven by suitable motors (not shown). The illustrated chain is straight running, but it may be various other types such as sideflexing, etc.

The illustrated closed-loop chain is a common synthetic-resin slat type that is trademarked "TableTop". The links 18 of such chain have flat upper surface portions 19 that lie in a single horizontal plane except when the chain is bending upwardly or downwardly around a sprocket. The undersides of the links of the chain have intermeshing bearing (hinge) and other elements 20, the relationships being such that the chain links are pivotally associated with each other by means of pins 21 that extend through bores in registered bearing or hinge elements.

As shown in FIG. 1, the undersides of the end portions of the synthetic resin links 18 slide along the upper horizontal surfaces of upper wear strips 17. This occurs for any desired length of conveyor, until the upper portion of the chain (or belt) curves downwardly around a sprocket (an idler sprocket or a motor-driven drive sprocket) and therefore inverts. The flat upper surface portions 19 of the links 18 are then on the bottoms of the links, and slide along the return way apparatus next described.

In accordance with one aspect of the present invention, the same lower cross members, connectors, tubes or rods 14 that space the side frames 10,11 apart are employed in a certain manner to support elongate flexible synthetic-resin return way elements (lower wear strips). These wear strips, the lower wear strips, are not rollers, as have been used in the prior art, and which have distinct disadvantages. Such rollers were often mounted on cross members between side frames, and such cross members may be employed to support the below-described return way system.

In accordance with another major aspect of the present invention, the elongate lower wear strips are mounted on the lower cross members 14 by means of mounting elements or clips that snap-connect to such cross members. Furthermore, the lower wear strips are themselves snapped into the mounting elements or clips. Thus, in many instances especially for the smaller sizes, no tools at all need be employed in order to mount the present return way system in either existing or new conveyor systems. However, the use of tools is not excluded.

The above-indicated elongate lower wear strips are numbered 22 and 23 in FIGS. 1-4 and 7. The above-indicated mounting elements or clips are numbered 24 in those figures and also in FIGS. 5 and 6. Each wear strip is an elongate synthetic resin element that is, very preferably, an extrusion made from UHMW. The wear strips 22,23 are identical to each other when extruded, but are—in the preferred embodiment—bent into 180-degree out-of-phase serpentine bends or undulations. Each clip or mounting element 24 is preferably identical to each other clip or mounting element.

Referring particularly to FIG. 7 (which shows either end or cross-sectional views of the wear strips 22,23), each such strip or element 22,23 has a horizontal upper surface 26 that is in flatwise engagement with surface portions 19 of those chain links 18 that are in the lower run of the closed-loop chain. Such upper surface 26 is on what may be termed a head portion 27 of each wear strip 22,23. Each head portion 27 is at the upper end of a vertically elongate body 28. Provided on opposite sides of body 28, generally midway between head portion 27 and the lower surface of body 28, are generally arcuate convex protuberances 29, these protuberances being diametrically opposite each other and spaced equal distances from an imaginary vertical plane containing the longitudinal axis of each strip element. Such plane is midway between vertical sides of head portion 27 and of body 28, and is indicated by the dashed line P in FIG. 5.

Each protuberance 29 is preferably, in section or end view as shown in FIG. 7, a segment of a circle.

Proceeding to a description of the clips or mounting elements 24, each of these is a strong, resilient molding made of a synthetic resin such as acetal. When viewed in side elevation, each such molding is generally U-shaped, being preferably symmetrical about a vertical central plane that is perpendicular to the plane of FIG. 6 (and also perpendicular to plane P). The portions of the clip or mounting element on opposite sides of such vertical central plane are mirror images of each other, in the preferred form. Such last-mentioned portions are the arms of the clip.

Each clip has two body portions 31,32 the under sides of which connect integrally to a spring bridge 33 (FIG. 6). The adjacent upper portions of the bodies 31,32 are bevelled, having downwardly convergent surface regions shown at 34 in FIG. 6. The spacing between the upper ends of surface regions 34 is preferably (but not necessarily) larger than the diameter of cross member 14. The spacing between the lower ends of downwardly-convergent surface regions 34 is substantially smaller than the diameter of cross member 14. There are opposed parallel and vertical surface regions 36, below the lower ends of convergent surface regions 34, that are accordingly spaced apart a distance substantially smaller than the diameter of the member 14.

Referring next to the construction of spring bridge 33, which is preferably integral with the body portions 31,32, this has solid side portions 37 that converge downwardly as shown in FIG. 6, and that connect at their lower ends at a living hinge region indicated at 38. The opposed inner surface regions 39 of side portions 37 ar concave and substantially portions of the same cylinder, having shapes and sizes that correspond to the exterior cylindrical surface of cross member 14. The upper ends of surface regions 39 (FIG. 6) merge with the parallel surface regions 36.

The sizes are so selected that the cylindrical surface regions 39 frictionally grip the exterior of cross member 14 relatively lightly, the relationships being such that the clip 24 may be manually slid along the member or may be manually rotated on the member. On the other hand, in the preferred form, the friction gripping between regions 39 and the surface of member 14 is sufficient to prevent free spinning or sliding of clip 24 on the cross member.

The lower portion of each spring bridge 33 is relatively thick as viewed in FIG. 6. Referring next to the living hinge 38, this comprises a horizontal groove 41 (FIG. 6) that communicates with the cylindrical opening defined between surface regions 39. Groove 41 extends downwardly toward the bottom of the spring bridge 33 at the center thereof. The bottom of groove 41 communicates with two vertical grooves 42. The vertical grooves 42 are shallow, there being one vertical groove on each side of a lower connector portion 43 (FIG. 7) of the living hinge 38.

The depth of horizontal groove 41, the depths of vertical grooves 42, the thickness of the lower central portion 43 of spring bridge 33, and the material employed to manufacture the clip or mounting element 24, are all selected in such manner that the spring bridge 33 and its living hinge 38 will permit body portions 31,32 to move away from each other a distance sufficient that surface regions 36 permit member 14 to slide therebetween, without breaking the element 24.

Accordingly, to mount each of the elements 24 on its associated member 14, the operator manually presses the mounting element or clip 24 against the member 14 in such relationship that the convergent surface regions 34 engage opposite regions of the cylindrical surface of member 14. The mounting element or clip 24 is then pressed with sufficient force to cause the surface regions 36 to pass over diametrically-opposed parts of member 14, so that the member 14 is then disposed in the spring bridge 33, with the surface regions 39 pressed lightly against opposite sides of the member 14. Then, the mounting element or clip may be slid along the member 14, or rotated, to any desired position, at which it remains due to the light pressing of surface regions 39 against the member 14.

Proceeding next to a description of each body portion 31,32 of each clip or mounting element 24, these are constructed to receive one of the return way elements 22,23 in resilient gripping relationship, and also in such relationship that the undersides of the elements 22,23 (wear strips) are pressed against the upper sides of tubes 14. Accordingly, the weight born by the wear strips 22,23 when the conveyor chain rests thereon is transmitted directly to the tubes 14.

As shown in FIG. 7, each body portion 31,32 of each clip 24 is generally U-shaped in end elevation or vertical section, in a plane perpendicular to that of the entire clip 24 (FIG. 6). Stated otherwise, the U-shaped view shown by FIG. 7 is perpendicular to the U-shaped view shown by FIG. 6.

The arms of the U are numbered 45,46 in FIG. 7. They are sufficiently thin to have sufficient resilience that one of the wear strips 22,23 may be manually forced or snapped therein. The arms 45,46 have opposed bevelled edges at the upper ends thereof, and which are adapted to receive and be spread by protuberances 29 of wear strips 22,23.

The arms 45,46 have generally cylindrical concave regions 47 intermediate the upper and lower ends thereof, and which are adapted to receive the protuberances 29. The relationships are caused to be such that the upper regions of protuberances 29 engage upper portions of arms 45,46 when the lower end of body 28 is in pressing relationship to the upper side of member 14. Thus, slight gaps are shown between the lower regions of protuberances 29 and the arm regions immediately adjacent thereto.

As shown at the lower portion of FIG. 7, a spacer element 48 having upwardly and then downwardly bent ends 49 is hooked over lower connector portions 43 of the living hinge region 38 of two adjacent clips 24. The vertical dimensions of the end regions 49 are so great that the spacer element 48 may not be removed from the assembled relationship shown in FIG. 7, because upper horizontal surfaces of the end regions would first engage the underside of tube or connector 14. Element 48 can only be mounted, or removed, before or after two adjacent clips have been mounted on the member 14. It is, however, possible to mount one end 49 over one connector portion 43, because the main body of the spacer 48 can then be pivoted to various positions--for example moved from generally vertical to generally horizontal. It is pointed out that vertical portions of end regions 49 of spacers 48 are disposed in the grooves 42.

OPERATION

The present system is mounted in a conveyor while the chain C made up of links 18 is not present. Thus, it is possible to manipulate the present elements from above and below.

Firstly, a plurality of clips or mounting elements 24 are snapped onto the tubes or rods (cross members) 14 in the lower row. In the illustrated form, there are two clips 24 on each rod 14, but (as above stated) there could be increased numbers of clips for wider conveyor systems. Each clip 24 is snapped onto a rod 14 by manually pressing a clip against the rod so that the convergent surfaces 34 (FIG. 6) spread the side portions 37 until the rod snaps into the hole defined by surface regions 39. During this action, the living hinge 38 flexes as above described. Preferably, as described, the clips are frictionally retained against rotation on a rod, but not with so much friction that the clips are prevented from being manually moved along their associated rods.

Figure 2:
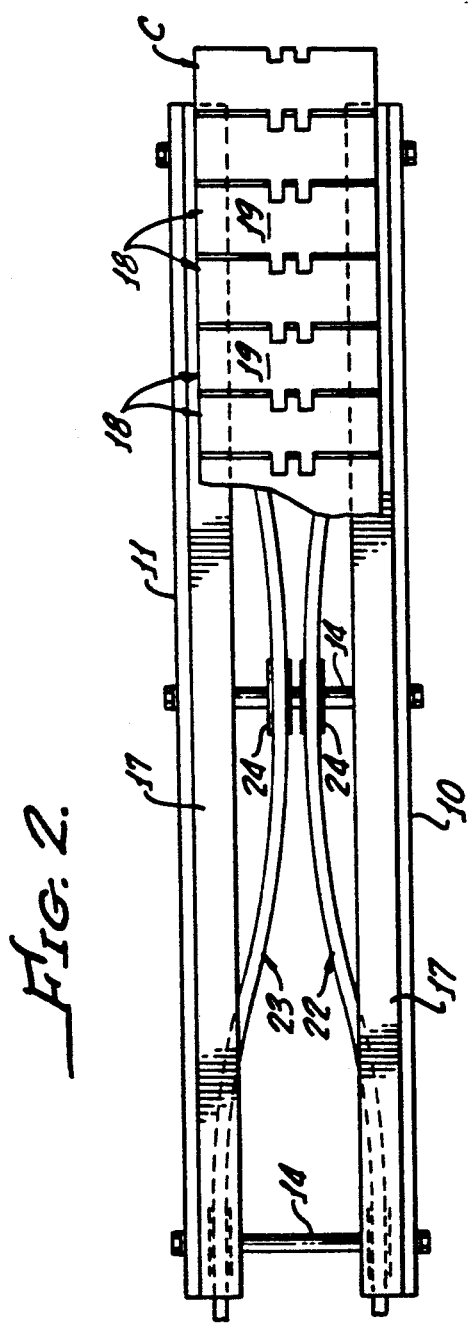
FIG. 2 is a top plan view of the conveyor, the chain being shown only at one end portion of the carrying way.
Figure 3:
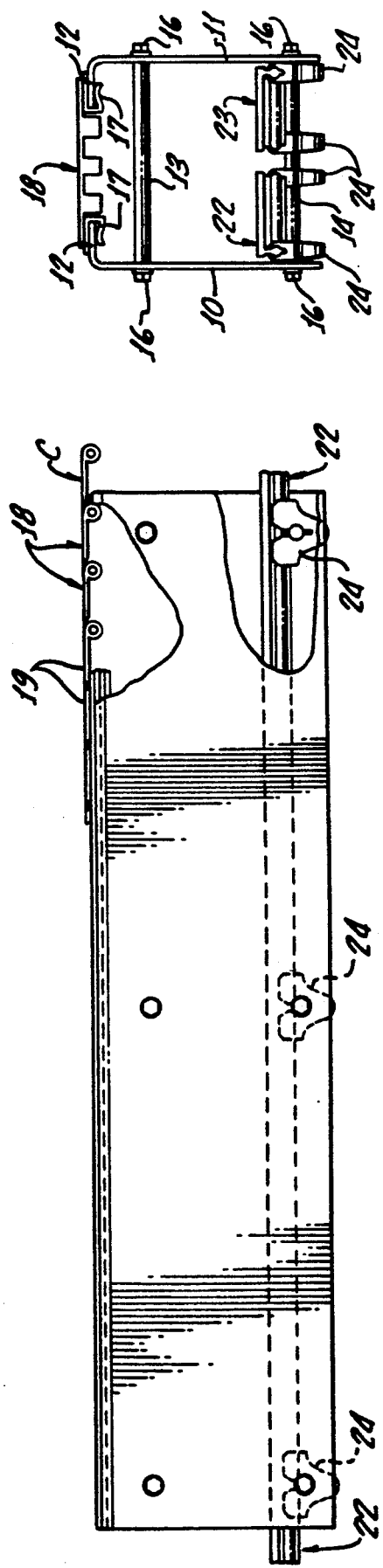
FIG. 3 is a side elevational view of the conveyor, portions of the side frame being broken away to show regions of the return way and the carrying way.

As shown in FIGS. 2 and 4, the clips 24 on alternate rods are spaced substantial distances apart. On the remaining alternate rods, the clips are quite close to each other. Thus, the associated ways 22,23 assume undulating or serpentine configurations after they are mounted, this being in order to prevent grooves from being worn into the upper surface portions 19 of the conveyor links 18 after long periods of use of the conveyor system.

The clips that are relatively adjacent each other, as shown at the center in FIG. 2 and as shown in FIG. 7, are held in predetermined spaced relationship by spacer 48. This is not to imply that the clips or mounting elements would necessarily move in the absence of such a spacer; the spacer primarily determines the distance between the parts during the mounting operation as well as thereafter.

As the next step in the operation, the wear strips 22,23 are snapped downwardly into the U-shaped upper portions of the clips 24. Thus, starting at (for example) the member 14 at the left end of FIG. 2, the installer employs his or her fingers and thumbs to squeeze on clips 24 while at the same time pushing downwardly on one of the wear strips 22,23. The arms 45,46 at the upper regions of the clips then spread apart sufficiently that the protuberances 29 snap into the regions defined by concave surfaces 47. As above described, the relationships are such that the resilient arms 45 tend to force the ways 22,23 downwardly into tight engagement with the upper surfaces of connectors 14.

After connections have thus been made at the left cross member 14, they are made at the next cross member, for example the one shown at the center in FIG. 2. The operations are the same, except that the wear strips are close together as shown. At the next cross member, the same procedure is performed as described relative to the left member 14 in FIG. 2, the clips then being spaced apart at the same distance shown in FIG. 2 at the left end thereof.

Accordingly, in a very short time period, and without the need for tools or fasteners, or renewal or replacement of any cross member, mountings and connections are made using the usually already-existing cross members 14. Each joint is tight and firm, and there is direct transmission of the weight of the conveyor chain onto the cross members 14 without need for relying on the strengths of the clips 24.

In at least the preferred configuration, in which the strips 22,23 are oriented in serpentine relationship, 180 degrees out-of-phase relative to each other, there is a twisting action effected between each wear strip and each clip such that the clips are quite firmly held in their desired positions on the cross members 14. This twisting action substantially increases the binding relationship between surface regions 39 (FIG. 6) and the surface of member 14. If the Ways 22,23 were straight and not serpentine, and were parallel to the side frames 10,11, a certain amount of force would be required to move the clips 24 along the tubes 14 after the ways have been snapped into the clips. However, with the described serpentine relationship, in which there is twisting, a greater amount of force is required in order to move the clips 24 along the tubes 14. Accordingly, the apparatus is usually stable and the strips are properly maintained in the desired spaced and undulating relationships.

Thereafter, it is merely necessary to mount the chain C in order to complete the combination return way and conveyor chain system.

The preferred acetal for making all of the mounting clips of all embodiments, and the intermediate clip described below relative to the second embodiment, is DELRIN 500T, by DuPont Corporation.

DETAILED DESCRIPTION OF THE SECOND EMBODIMENT

The below-described second embodiment is the preferred embodiment at the time of filing of this continuation-in-part patent application, but (as stated below) elements of the first embodiment are still often used—depending upon characteristics of the conveyor system. Except for the important differences stated below, the second embodiment is identical to the first embodiment.

In the second embodiment shown in FIGS. 8—15, inclusive, parts that have correspondence to parts in the first embodiment are given the same reference numbers except followed in each instance by the letter "a".

Referring first to FIG. 8, side frames 10a,11a are connected together by (preferably) uniformly-spaced lower cross members or connectors in the form of lower rods or tubes 14a. As in the case of the first embodiment, the ends of the members 14a are secured to the side frames by screws (or bolts) 16a.

As stated relative to the first embodiment, the members 14a are spaced from each other longitudinally of the side frames 10a,11a, as shown in FIG. 8. Also as previously stated, the present invention may be employed relative to either existing or new conveyor systems. For either new or existing systems, it is preferred by applicants that the spacing usually between each two cross members 14a be in the range of eighteen inches to thirty inches, the most desirable spacing being about 25 inches.

In accordance with one aspect of the second embodiment, the illustrated serpentine or undulating wear strips 22a,23a are directly supported by cross members 14a only at the regions where such wear strips are farthest from each other, not at the regions where the wear strips are closest to each other. Thus, as shown in FIG. 8, the 180-degree out-of-phase wear strips 22a,23a are supported by members 14a at their most spaced-apart points, as shown at the left, center and right, and not at their adjacent points—one of which is where section line is located in FIG. 8.

Because of the larger span between support regions, the vertical dimensions of the wear strips 22a,23a are made significantly larger than is the case relative to the wear strips of the first embodiment, reference being made to FIGS. 9 and 7. Stated otherwise, the vertically elongate bodies 28a of the clips 24a are elongated further than relative to the clips of the first embodiment. The vertical dimension of an exemplary wear strip 22a,23a is one inch. (It is, however, pointed out that wear strips having smaller vertical dimensions, for example as shown in FIG. 7, may be employed in some instances in large-span applications, depending upon such factors as load, span length, etc.)

The mounting clips 24a that associate wear strips 22a,23a with cross members 14a are substantially identical to what was described in detail relative to the first embodiment. Because of the greater vertical dimension of the body 28a of each wear strip, the wear strip extends upwardly out of the mounting clip to a substantially greater extent than is the case relative to the mounting clip of the first embodiment.

As best shown in FIGS. 11 and 14, an intermediate clip, or pinch clip, 55 is provided half way between each two adjacent cross members 14a, to pull the wear strips 22a,23a into close proximity with each other. The pinch clip is molded, preferably of the same material employed to make mounting clips 24 and 24a and snaps onto the undersides of wear strips 22a,23a.

Referring to FIG. 14, each pinch clip 55 has a center section 56 that is spaced away from resilient arms 57, there being a solid bottom portion 58 that connects the bottom of center section 56 to the lower ends of arms 57. Thus, two grooves 59 are formed, one on each side of the center section 56, and are shaped to receive the lower portions of wear strips 22a,23a.

Stated more definitely, the walls of each groove 59 in each pinch clip 55 are substantially complementary to the walls of the lower portion of each wear strip 22a,23a. Thus, opposed wall portions of each groove 59 are concave so as to snugly receive the rounded protuberances 29a of each wear strip. Below such groove wall portions, there is a groove portion that receives the lower edge of the body 28a of each wear strip.

At the upper portion of each pinch clip 55, on opposite sides of each groove 59, there are downwardly-convergent surface regions 61,62. These are adapted to be engaged by the lower regions of protuberances 29a when pinch clip 55 receives in grooves 59 the lower regions of the wear strips. As the protuberant portions 29a pass downwardly into grooves 59, the arms 57 are caused by portions 29a to spread apart and then come somewhat together, thus holding the wear strips firmly in the pinch clip 55. Stated otherwise, there are cam actions between protuberant portions 29a and downwardly convergent surface regions 61,62 that cam the arms 57 away from center section 56, following which the arms move toward center section 56 as protuberant portions 29a are received in the concave regions of the walls of grooves 59.

There is next described a spacer system that is employed on the cross members 14a, in the present embodiment and also in the first embodiment of the invention, especially when the cross members 14a are in such an environment as to tend to be slippery. Each spacer system comprises an elongate split sleeve 63 (FIG. 12) the length of which corresponds to the desired spacing between clip 24a when wear strips 22a,23a are at their most spaced-apart regions, and the inner diameter of which is somewhat less than the outer diameter of members 14a.

A gap 64 is present between parallel edges of sleeve 63, the relationship being such that the sleeve may be pressed down on cross member or rod 14a so that the sleeve 63 snaps onto and clings to the cross member. As shown at the right in FIG. 12, the wall thickness of the sleeve is greater at regions opposite gap 64 than at regions relatively adjacent such gap.

The spacer system further comprises spacer pins 65 which are preferably molded integrally with the mounting clips 24a and extend laterally therefrom for desired distances. In the illustrated example, the length of each spacer pin is generally the same as the thickness of each mounting clip 24a.

The diameter of the outer end of each pin 65 is sufficiently large that the pin ends will abut and not overlap (shingle) relative to each other when the pins are disposed nose-to-nose as described below relative to FIG. 15. In the connection it is pointed out that the pins 65 are maintained in a horizontal plane due to the fact that the wear strips are snapped therein and thus prevent the mounting clips 24a from rotating about members 14a.

The length of each sleeve is determined in accordance with the particular conveyor system. Thus, the distance between side rails, the number of return way systems, etc., all are employed in determining how long to make each sleeve 63.

Referring to FIG. 11, the length of sleeve 63, the widths of mounting clips 24a, and the lengths of pins 65 effectively and positively trap the mounting clips at predetermined positions between the vertical walls of side frames 10a,11a. Thus, even in situations where the environment is wet and conducive to slipperiness of the rods 14a, and regardless of the vibrations induced by movement of the chain Ca, the mounting clips 24a and thus the wear strips are positively maintained in the exact positions desired.

It is pointed out that the pins 65 need only be provided on one side of each mounting clip 24a, which mounting clip is turned in the appropriate direction such that the end of each pin will abut a side frame 10a,11a when the mounting clips are mounted as shown in FIG. 11.

Referring next to FIG. 15, the relationships are shown which occur when a plurality (in this case, two) of return-way systems are mounted for support of a wide conveyor chain or, alternatively, for support of a plurality of stacked conveyor chains. It is pointed out that the left half of FIG. 15 corresponds substantially to the right half of FIG. 11, whereas the right half of FIG. 15 corresponds substantially to the left half of FIG. 11. This is to indicate that there are two systems (entire) as partially shown in FIG. 11, disposed side by side by with no side frame between them. Instead, the side frames (not shown) are spaced twice as far apart than what is shown in FIG. 11 (or three times as far or four times as far apart, etc.). Then, additional sleeves 63 are mounted on the cross member 14b, such member 14b corresponding to member 14a except that it is much longer.

At the ends of members 14b, adjacent the interior surfaces of the unshown side frames, the mounting clips 24a are so turned that their pins 65 engage the side frames as shown in FIG. 11.

The relatively wide chain is given the reference numeral 67, comprising transversely-elongate slats 68 as well as hinge elements such as are shown in FIG. 11 but unshown in FIG. 15.

OPERATION, SECOND EMBODIMENT OF THE INVENTION (FIGS. 8-15)

The present "operation" summary is to be considered in connection with the portion of this specification under the previous "operation" subhead.

The present system is extremely flexible relative to its applicability to different types of chain systems, different numbers of chains, different widths of chains, different weights of chains, etc. For example, if the chain is a relatively narrow light plastic chain, it is ideal in that the return way system requires relatively few components all of which may be easily snapped into their proper places. If the spans between rods 14a are large, the relatively deep (large vertical dimension) wear strips 22a,23a are employed, along with the pinch clips 55. If the spans between adjacent rods 14a are small, the system described relative to the previous embodiment may be employed or (alternatively) alternate rods or cross members 14a may be removed or not used.

Also, if the chain is a heavy metal chain as distinguished from a light plastic chain, the system described relative to the first embodiment can be used because there is more support for the heavy metal. It is to be understood, however, that relative to both the first and second embodiments the spacers 63 and spacer pins 65 are preferably employed.

When there is a very wide chain, or two, three or four (or more) stacked chains, a plurality of the return way systems are used as described relative to FIG. 15, for example. It is to be understood that the chain means illustrated in FIG. 15 may be replaced by two separate and adjacent stacked chains, with each one of the stacked chains riding on its own return way system (for example, the system described relative to FIG. 11).

As described relative to the first embodiment, the wear strips 22a,23a are snapped down into the mounting clips 24a after the latter have been snapped upwardly onto the rods 14a. Then, or previously, the split-sleeve spacer 63 (FIG. 12) is mounted on the rod 14a between each pair of mounting clips 24a. As described, when there are stacked chains, or very wide chains, additional spacers 63 are provided.

When there is more than one return way system employed, the spacer pins 65 described relative to FIGS. 13 and 15 are employed to cooperate with the sleeves 63 and with the mounting clips 24a to achieve the desired spacing and to lock the mounting clips 24a (and thus the wear strips 22a,23a) in position regardless of the amount of lubrication that may be present on the connector rods 14a.

It is pointed out that the return way systems are so disposed as to minimize wear on the inverted slats 18a of the chain.

As previously described, the mounting clips 24a may be turned so that their spacer pins 65 face the desired directions. In FIG. 15, the pins 65 face toward each other and abut at their noses or outer ends. In FIG. 11, the pins face in opposite directions and abut the side frames (this being also true relative to unshown mounting clips in the system of FIG. 15).

As previously pointed out, the wear strips very preferably rest directly on the members or rods 14a, so that there is no tendency for the weight of the chain to tend to push the mounting clips 24 downwardly. Also as previously noted, the wear strips prevent the mounting clips 24a from rotating about the centers of rods 14a. Rotation of the mounting clips 24 about a vertical axis is prevented by the rods 14a themselves. Thus, when the mounting clip 24a appears by itself as in FIG. 13, there is no apparent locating means for the ends or noses of pins 65. However, after the mounting clips have been snapped onto rods 14a, and after the wear strips have been mounted in the grooves in the mounting clips, the ends of pins 65 are so precisely located that the nose-to-nose relationships shown in FIG. 15 are readily maintained provided the diameters of the nose ends are not excessively small.

It is emphasized that the main large arms of each clip 24a are in straddling relationship to the associated cross member 48. Also, the arms of each clip 24a that define the grooves for wear strips 22a,23a are in straddling relationship to the lower portion of the associated wear strip.

The foregoing detailed description is to be clearly understood as given by way of illustration and example only, the spirit and scope of this invention being limited solely by the appended claims.

What is claimed is:

1. A way or rail system for conveyors, which comprises:
   a support element adapted to be mounted adjacent a conveyor belt or chain;
   an elongate synthetic resin way or rail; and
   a mounting clip means to associate said way or rail with said support element;
   said mounting clip means including a portion which snaps onto said support element;
   said mounting clip means further including a portion which snaps onto said way or rail;
   said portion of said mounting clip means which snaps onto said support element being generally U-shaped.

2. The invention as claimed in claim 1, in which said way or rail is made of ultra high molecular weight polyethylene.

3. The invention as claimed in claim 1, in which each of said mounting clip means is made of acetal synthetic resin.

4. The invention as claimed in claim 1, in which said support element extends horizontally between side frames of a conveyor system, and in which said way or rail is mounted above said support element.

5. The invention as claimed in claim 4, in which said conveyor belt or chain is mounted such that said belt or chain slides on said way or rail.

6. The invention as claimed in claim 4, in which two of said ways or rails are mounted above said support element by two of said mounting clip means.

7. The invention as claimed in claim 6, in which said two ways or rails are bent in serpentine manner.

8. The invention as claimed in claim 7, in which said serpentine ways or rails form the return way of a closed-loop conveyor chain.

9. The invention as claimed in claim 1, in which said portion of each of said mounting clip means which snaps onto said way or rail is generally U-shaped.

10. The invention as claimed in claim 9, in which there are on each mounting clip means two U-shaped portions which snap onto one way or rail, said last-mentioned U-shaped portions being at the ends of the arms of said U-shaped portion which snaps onto said support element.

11. The invention as claimed in claim 10, in which said U-shaped portions which snap onto said way or rail are in a plane generally perpendicular to said U-shaped portion which snaps onto said support element.

12. A way or rail system for conveyors, which comprises:
   (a) a plurality of support elements adapted to be mounted adjacent a conveyor belt or chain,
   (b) an elongate synthetic resin way or rail, and
   (c) a plurality of mounting clip means to associate said way or rail with said support elements, each of said mounting clip means including a portion which snaps onto one of said support elements, each of said mounting clip means further including a portion which snaps onto said way or rail, said portion of each of said mounting clip means which snaps onto said way or rail being generally U-shaped.

13. The invention as claimed in claim 12, in which said way or rail is made of ultra high molecular weight polyethylene.

14. The invention as claimed in claim 12, in which each of said mounting clip means is made of acetal synthetic resin.

15. The invention as claimed in claim 12, in which said support elements extend horizontally between side frames of a conveyor system, and in which said way or rail is mounted above said support elements.

16. The invention as claimed in claim 15, in which said conveyor belt or chain is mounted such that said belt or chain slides on said way or rail.

17. The invention as claimed in claim 15, in which two of said ways or rails are mounted above said support elements by different ones of said mounting clip means.

18. The invention as claimed in claim 17, in which said two ways or rails are bent in serpentine manner.

19. The invention as claimed in claim 18, in which said serpentine ways or rails form the return way of a closed-loop conveyor chain.

20. A mounting device for supporting wear strips in a conveyor system, said conveyor system having horizontal cross members connected between side frames of said system, said device comprising:
  (a) a first generally U-shaped element, said first U-shaped element having arms spaced sufficiently far from each other that said arms will straddle one of said cross members when said first U-shaped element is shifted upwardly onto said one cross member, there being no need to remove said one cross member for mounting of said first U-shaped element thereon,
  (b) a second U-shaped element provided at the outer end portion of one of said arms of said first U-shaped element,
  said second U-shaped element having arms adapted to straddle a wear strip of said conveyor system,
  said second U-shaped element being oriented transversely to said first U-shaped element such that said wear strip will extend transversely to said one cross member when said first and second U-shaped elements respectively receive said one cross member and said wear strip.

21. The invention as claimed in claim 20, in which a third U-shaped element is provided at the outer end portions of the other of said arms of said first U-shaped element, said third U-shaped element having arms adapted to straddle said same wear strip straddled by said arms of said second U-shaped element when said second U-shaped element is in straddling relationship to said wear strip.

22. The invention as claimed in claim 21, in which said mounting device incorporating said first, second and third U-shaped elements is combined with said same wear strip and with said one cross member, said wear strip being above said one cross member, the base of said first U-shaped element being below said one cross member.

23. The invention as claimed in claim 21, in which said first, second and third U-shaped elements are molded integrally with each other of synthetic resin.

24. The invention as claimed in claim 21, in which arms of said first, second and third U-shaped elements are resilient and are respectively adapted to be shifted away from each other when moved into straddling relationship with said cross member and with said wear strip, and thereafter to shift toward each other as full straddling relationship is achieved.

25. The invention as claimed in claim 24, in which the shapes of said arms, the shape of said cross member, and the shape of said wear strip are so correlated that when said arms shift toward each other they hold said first U-shaped element on said cross member, and hold said wear strip in said second and third U-shaped elements.

26. The invention as claimed in claim 24, in which said wear strip and said cross member are combined with said mounting device formed by said first, second and third U-shaped elements, said wear strip being held in said second and third U-shaped elements in a position above said cross member, said cross member being secured in said first U-shaped element with the base of said first U-shaped element below said cross member.

27. The invention as claimed in claim 26, in which the shapes of said wear strip, cross member and mounting device are such that the bottom of said wear strip rests directly on said cross member.

28. The invention as claimed in claim 21, in which said first U-shaped portion is shaped such that its inside portion mates with said cross member, such that said first U-shaped portion is mounted firmly on said cross member.

29. The invention as claimed in claim 21, in which said second U-shaped portion is shaped such that said wear strip is mounted firmly onto said second U-shaped portion.

30. The invention as claimed in claim 21, in which said third U-shaped portion is shaped such that its inside surface mates with said wear strip, such that said wear strip is mounted firmly onto said third U-shaped portion.

31. The invention as claimed in claim 20, in which protuberant spacer means are provided on each of said mounting devices to space it from a side frame or from another mounting device.

32. The invention as claimed in claim 31, in which said protuberant spacer means is an elongate synthetic resin pin mounted on said mounting device.

33. The invention as claimed in claim 32, in which said pin and mounting device are molded integrally with each other.

34. A support system for a run of a conveyor chain in a conveyor system, said support system comprising:
  first and second side frames disposed generally parallel to each other;
  at least several elongate cross members, extending between said side frames, said cross members being parallel to each other and lying the same generally horizontal plane;
  at least two elongate wear strips disposed above said cross members, said wear strips being bent into serpentine configuration when viewed from above said support system, said serpentine wear strips being about 180-degrees out-of-phase with each other;

means mounted on each of said cross members to hold said wear strips directly above said cross members; and means mounted intermediate said cross members to connect together the portions of said wear strips that are generally half-way between said cross members, said wear strips being so shaped and constructed as not to sag significantly at regions between said cross members.

35. The invention as claimed in claim 34, in which said means mounted intermediate said cross members is a pinch clip having two grooves therein, one groove being adapted to receive one of said wear strips, the other groove being adapted to receive the other of said wear strips, said grooves being relatively close to each other.

36. The invention as claimed in claim 35, in which said pinch clip is an integral synthetic resin element that snaps onto and grips the lower portions of said wear strips.

37. The invention as claimed in claim 34, in which said means mounted on each of said cross members comprises two mounting elements, each mounting element having a lower portion that sits on an associated cross member in straddling relationship, each mounting element also having an upper portion that receives a wear strip.

38. The invention as claimed in claim 37, wherein a spacer means is provided on said associated cross member to separate said mounting elements apart from each other.

39. The invention as claimed in claim 38, in which said spacer means has a longitudinal length sufficient to secure said mounting elements between said side frames.

40. The invention as claimed in claim 39, in which said spacer means is substantially tubular with a split portion resiliently adapted to open and substantially close when said spacer means is urged onto said cross member.

41. The invention as claimed in claim 40, wherein said spacer means is an integral synthetic resin element.

42. The invention as claimed in claim 37, wherein a spacer means is provided on each of said mounting elements to hold said mounting elements at a predetermined distance from said side frames or from other mounting elements of other support systems adjacent to said support system.

43. The invention as claimed in claim 42, in which said spacer means on said mounting elements comprise elongate synthetic resin pins, said means being molded integrally with said mounting elements in a direction longitudinal to said supports such that said means associate with other spacer means or said side frames.

44. A conveyor system, comprising:
(a) closed-loop conveyor chain means having a return run, and
(b) a return way system mounted beneath said return run to support the same,
said return way system comprising a plurality of elongate parallel supports extending between side frames, said return way system further comprising a pair of serpentine wear strips supported by said supports and disposed above the same,
said return way system further comprising a plurality of mounting elements mounted on said supports, and so constructed that said supports do not need to be removed in order to mount said mounting elements thereon,
each of said mounting elements having a relatively small dimension in a direction longitudinal to its associated support,
each of said mounting elements being adapted to receive a portion of one of said wear strips,
said return way system further comprising spacer protuberances provided on said mounting elements and extending in a direction longitudinal to such associated support, and
said return way system further comprising spacer means mounted on said supports and abutting said mounting elements to hold them apart,
said spacer means, said spacer protuberances and said mounting elements substantially fully occupying the length of said support to thus hold said mounting elements and wear strips in correct positions.

45. The invention as claimed in claim 44, in which said spacer means mounted on said supports are split sleeves adapted to be pressed onto said supports with no necessity for removing said supports from said side frames.

46. The invention as claimed in claim 44, in which said wear strips have a vertical depth sufficient to maintain said wear strips along the same generally horizontal plane upon which a plurality of said supports of said conveyor system are situated.

47. A combination for use in conveyor systems, said combination comprising:
a multiplicity of mounting elements each adapted to be mounted on a cross member of a conveyor system, each of said mounting elements having arm means and having U-shaped portions at the ends of said arm means, said U-shaped portions each having resilient arms; and
wear strips adapted to be received in said U-shaped arms of said arm means, characterized in that said wear strips and the opposed inner walls of said resilient arms have complementary surfaces such that when portions of said wear strips are snapped between said arms said arms move first apart and then together to resiliently hold said wear strips in said U-shaped portions.

48. The invention as claimed in claim 47, in which said resilient arms and said wear strips are so constructed and related that said wear strips sit directly on said cross members.

* * * * *

UNITED STATES PATENT AND TRADEMARK OFFICE
CERTIFICATE OF CORRECTION

PATENT NO. : 5,190,145

DATED : March 2, 1993

INVENTOR(S) : Stuart J. Ledingham and Dale I. Goldberg

It is certified that error appears in the above-indentified patent and that said Letters Patent is hereby corrected as shown below:

On the title page, items [19] and [75] the first inventor's last name change "Ledginham" to --Ledingham--.

Column 14, line 35, change "shaped such that said wear strip" to --shaped such that its inside surface mates with siad wear strip, such that said wear strip--.

Signed and Sealed this

Eleventh Day of January, 1994

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,190,145
DATED : March 2, 1993
INVENTOR(S) : Stuart J. Leingham, et al It is certified that error appears in the above-indentified patent and that said Letters Patent is hereby corrected as shown below:

On the title page, items [19] and [75] the first inventor's last name change "Leginham" to --Ledingfham--.

Column 14, line 35, change "shaped such that said wear strip" to --shaped such that its inside surface mates with said wear strip, such that said wear strip--.

This certificate supersedes Certificate of Correction issued January 11, 1994.

Signed and Sealed this

Sixth Day of September, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,190,145
DATED : March 2, 1993
INVENTOR(S) : Stuart J. Ledingham and Dale I. Goldberg It is certified that error appears in the above-indentified patent and that said Letters Patent is hereby corrected as shown below:

On the title page, items [19] and [75] the first inventor's last name change "Ledginham" to --Ledingham--.

Column 14, line 35, change "shaped such that said wear strip" to --shaped such that its inside surface mates with said wear strip, such that said wear strip--.

This certificate supersedes Certificate of Correction issued September 6, 1994.

Signed and Sealed this

Twenty-second Day of November, 1994

Attest:

BRUCE LEHMAN

*Attesting Officer*  *Commissioner of Patents and Trademarks*